United States Patent [19]
Kyoren et al.

[11] Patent Number: 5,354,964
[45] Date of Patent: Oct. 11, 1994

[54] LASER TORCH

[75] Inventors: Yasuo Kyoren, Hiroshima; Hiroshi Fukuoka, Higashihiroshima; Takafumi Fukai, Hiroshima, all of Japan

[73] Assignee: Mazda Motor Corporation, Hiroshima, Japan

[21] Appl. No.: 114,048

[22] Filed: Aug. 31, 1993

[30] Foreign Application Priority Data

Aug. 31, 1992 [JP] Japan ................. 4-232097

[51] Int. Cl.⁵ .............................................. B23K 26/14
[52] U.S. Cl. ........................ 219/121.84; 219/121.63; 219/121.67
[58] Field of Search ................ 219/121.84, 121.63, 219/121.64, 121.67, 121.72

[56] References Cited

U.S. PATENT DOCUMENTS 4,866,242  9/1989  Martyr ..................... 219/121.64
5,142,119  8/1992  Hillman et al. ........... 219/121.64
5,183,992  2/1993  Bilge et al. ................ 219/121.64

FOREIGN PATENT DOCUMENTS 63-127794  8/1988  Japan .

Primary Examiner—C. L. Albritton
Attorney, Agent, or Firm—Keck, Mahin & Cate

[57] ABSTRACT

A laser working device for working a workpiece moving in one direction has a converging lens for focusing and directing approximately vertically a laser beam onto the workpiece, a gas injector for injecting and directing an inert gas forwardly with respect to the one direction and toward where the laser beam is focused, and an air injector for forming a pressurized air curtain between the converging lens and workpiece so that the air curtain crosses the vertical laser beam.

6 Claims, 2 Drawing Sheets.

LASER TORCH

BACKGROUND OF THE INVENTION

1. Field of the Invention

The present invention relates to a laser torch for working metal workpieces, and more particularly, to a laser working torch which is provided with an air ejecting means for forming an air curtain between a laser beam converging lens and a workpiece.

2. Description of Related Art

Typically, laser working torches or devices for working or processing metal workpieces, for instance welding metal workpieces or cutting a metal workpiece, with laser beam are provided with a beam converging lens, which is supported within a housing formed with an opening through which the laser beam is directed toward a workpiece. Such a laser working device converges and directs a high energy laser beam, generated by a high power laser, such as a carbonated dioxide laser, onto a metal workpiece with a converging lens so as to melt a radiated part of the metal workpiece. One of laser working devices of this kind is known from, for instance, Japanese Unexamined Utility Model Publication No. 63-127794.

Generally, laser working devices of this kind are provided with gas injection means for injecting and directing an inert gas, such as an argon gas, toward a workpiece so as to cover a portion of the workpiece in an atmosphere of the inert gas, thereby preventing the workpiece, especially the part under working, from being oxidized.

A problem accompanying these laser working devices is that molten spatters scatter from a workpiece and stick to the converging lens. For this problem, the laser working device is typically provided with a protective glass plate, which in turn is positioned between the converging lens and a workpiece, and an air injection means by which an air curtain is formed so as to expand and intersect an axis of the laser beam at an approximately right angle. Through the use of the protective glass plate and air curtain, the converging lens is protected against scattering molten spatters.

Although there is no interference between an inert gas and an air curtain, however, the air curtain approximately perpendicularly intersecting the laser beam easily allows molten spatters scattering toward the converging lens to pass therethrough. In order to prevent molten spatters from passing through the air curtain, it is suggested that the air injection means must inject air at a high pressure. However, in this instance, a highly pressurized air curtain causes a negative pressure therearound, so as to generate a problem that molten spatters scattering from a workpiece more easily pass through the air curtain. These molten spatters passed through the air curtain stick to the protective glass plate. Thus, one needs to clean up the dirty protective glass plate or to replace the dirty protective glass plate with a new one, either alternative being undesirable.

SUMMARY OF THE INVENTION

It is a primary object of the present invention to provide a novel arrangement for a laser working device provided with a converging lens for focusing and directing a laser beam toward a workpiece in which an air curtain formed more efficaciously between the converging lens and a workpiece prevents molten spatters scattering from the workpiece from reaching the converging lens.

The foregoing object of the present invention is achieved by providing a laser working device, for working a workpiece moving in one direction, with a laser beam guided by means of laser radiation guide means from a laser. The device includes a housing in which a laser working head of the device is mounted and which, in turn, includes a converging lens, stationarily held in the housing, which focuses and directs an approximately vertically directed laser beam onto the workpiece moving horizontally beneath the laser working device. The device is provided with a gas injection means and an air injection means, both of which are secured to the housing or frame of the device. The gas injection means terminates in a nozzle that injects and directs an inert gas forwardly with respect to the direction in which the workpiece moves during working and toward the location where said laser beam is focused to envelop the region of the workpiece being radiated with inert gas. Further, the air injection means injects and directs at least one laminar of air, and preferably two, in the form of an air curtain, so that the laminar of air crosses the axis of the vertically downwardly directed laser beam between the converging lens and the workpiece and at approximately an acute angle to the laser beam and also is directed at an acute angle onto the surface of workpiece at a point downstream of the irradiated area of the workpiece, the point the laser beam is focused. The air injection means specifically comprises an air nozzle having at least one, and preferably two, horizontally extending, vertically spaced slit-like openings.

The device further comprises a cover member, such as a generally vertically oriented U-shaped wall, configured and located to surround the laminar of air.

According to the laser working device of the present invention, while the laser beam is being radiated onto a workpiece, the gas injector means injects and directs an inert gas to the workpiece at the point where the laser beam is focused, and simultaneously, the air injector means forms and directs at least one laminar of pressurized air, i.e., a pressurized air curtain, so that the air curtain intersects the axis of the laser beam at an acute angle relative to the beam and also to the workpiece. Because the air laminar or curtain is directed just downstream of where the laser beam is focused and the inert gas is directed, there is neither caused any interference between the inert gas and air curtain nor scattering of molten spatters from the workpiece toward the converging lens. Furthermore, because the air injector head is positioned within the U-shaped protection cover and surrounds the air curtain, the air curtain does not catch molten spatters in the ambient air.

BRIEF DESCRIPTION OF THE DRAWINGS

The above and other objects and features of the present invention will be clearly understood from the following description with respect to a preferred embodiment thereof when considered in conjunction with the accompanying drawings, in which.

DETAILED DESCRIPTION OF THE PREFERRED EMBODIMENTS

Figure 1:
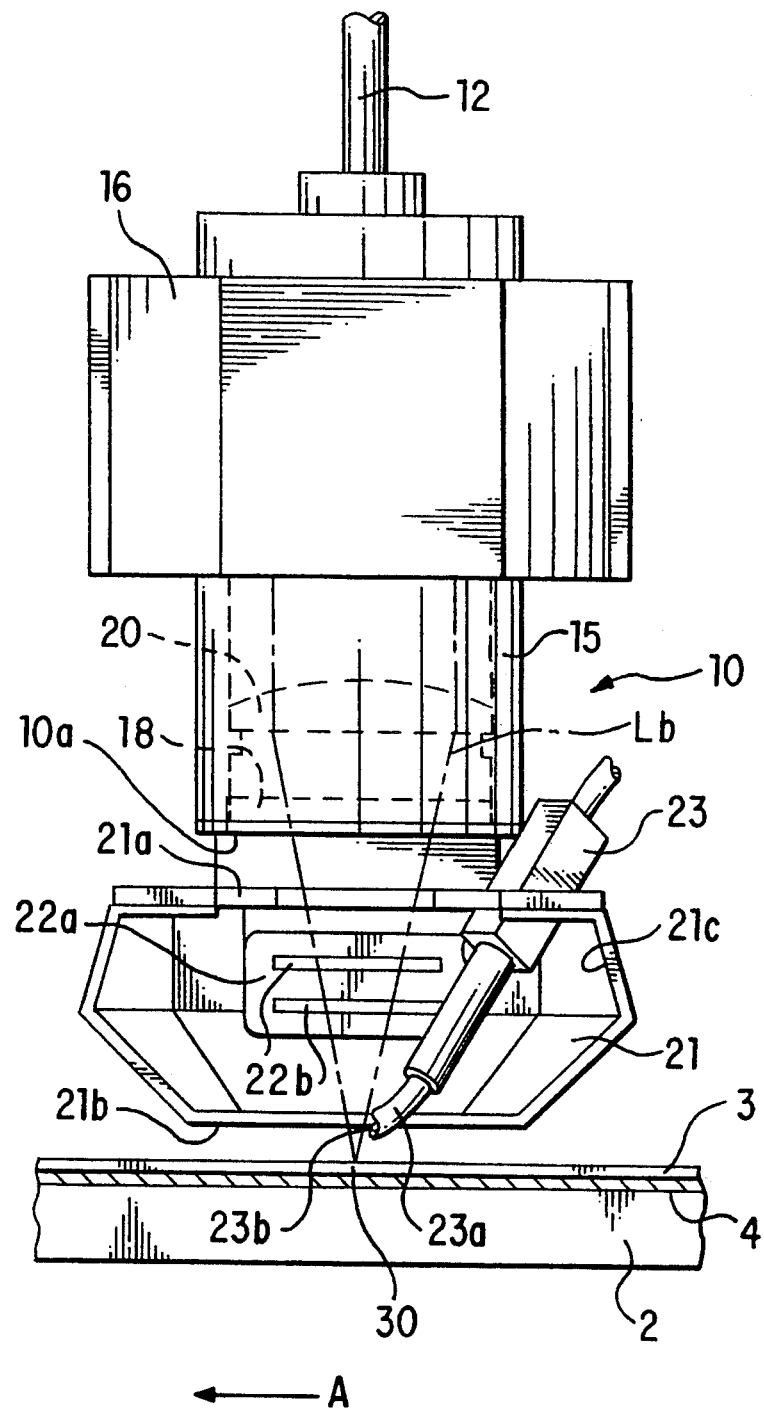
FIG. 1 is a front view of an essential part of a laser welding device in accordance with a preferred embodiment of the present invention.
Figure 2:
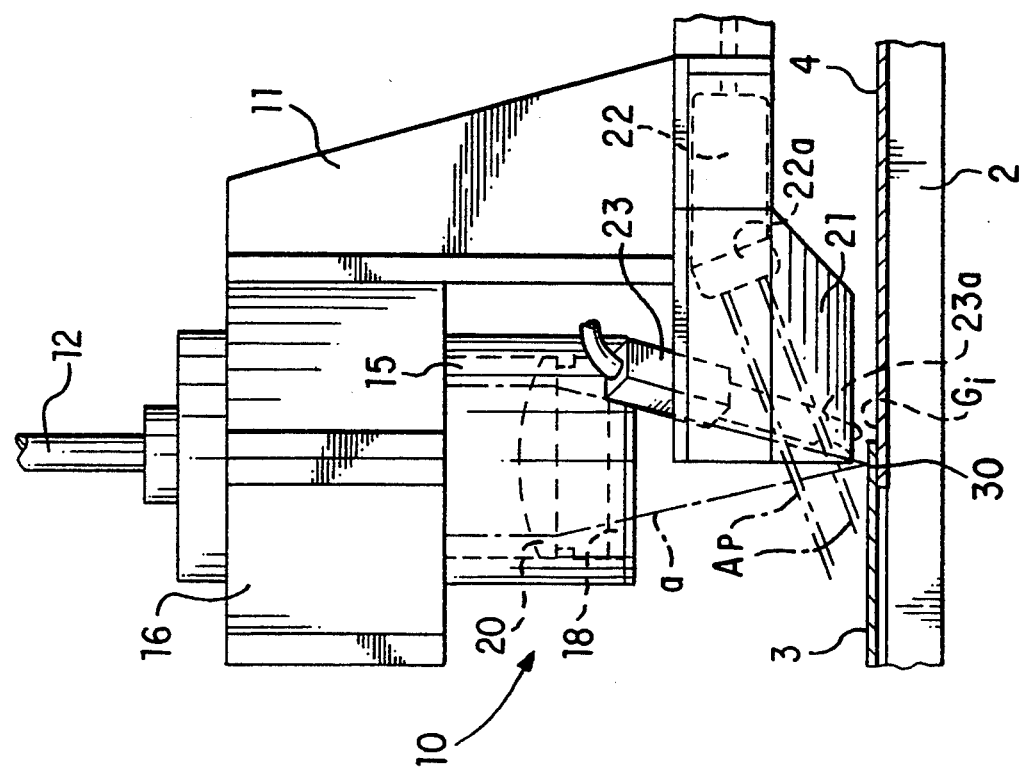
FIG. 2 is a side view of the laser welding device of FIG. 1.

Referring to FIGS. 1 and 2, a laser working head or torch 10 in accordance with a preferred embodiment of the present invention is shown. The welding torch 10 is part of an welding machine (not shown). Located below the laser welding torch 10 is a slide table 2 on which metal workpieces, such as flat aluminum plates 3 and 4, are placed with their side edges overlapped to form a lap seam. In this embodiment, the specific operation is lap seam welding by means of the laser welding torch 10 but other and various operations are contemplated. Specifically, the laser welding torch 10 focuses and directs a laser beam Lb onto the lap seam 30 of the superimposed flat aluminum plates 3 and 4. During the welding operation, the slide table 2 moves horizontally and linearly in one direction as shown by an arrow A, this being the same direction in which the lap seam 30 extends. In this manner, the lap seam 30 of the flat aluminum plates 3 and 4 is continually advanced with respect to the laser beam Lb, thereby welding the flat aluminum plates 3 and 4 along their side edges in lap seam welding.

The laser welding torch 10 has a generally cylindrical housing 15 rigidly held by a clamp arm 16 extending from a vertically mounted bracket 11 of the welding machine. Within the housing of laser welding torch 10, a flexible fiber cable 12 terminates. Cable 12 leads from a high power laser (not shown), such as a YAG (yttrium aluminum garnet) laser, so as to guide or transmit a YAG laser radiation into the upper part of housing 15 and to direct same vertically downward. The housing 15 is essentially a top closed end cylinder with its open bottom end 10a fitted with a protective glass plate 18 at a specific preselected distance above from the slide table 2. Within the housing 10 there is mounted a converging or focusing lens 20 by means of which the laser beam Lb guided by the fiber cable 12 is focused on the lap seam 30 of the flat aluminum plates 3 and 4 so as to melt and weld them as the slide table 2 moves in the A direction.

Figure 3:
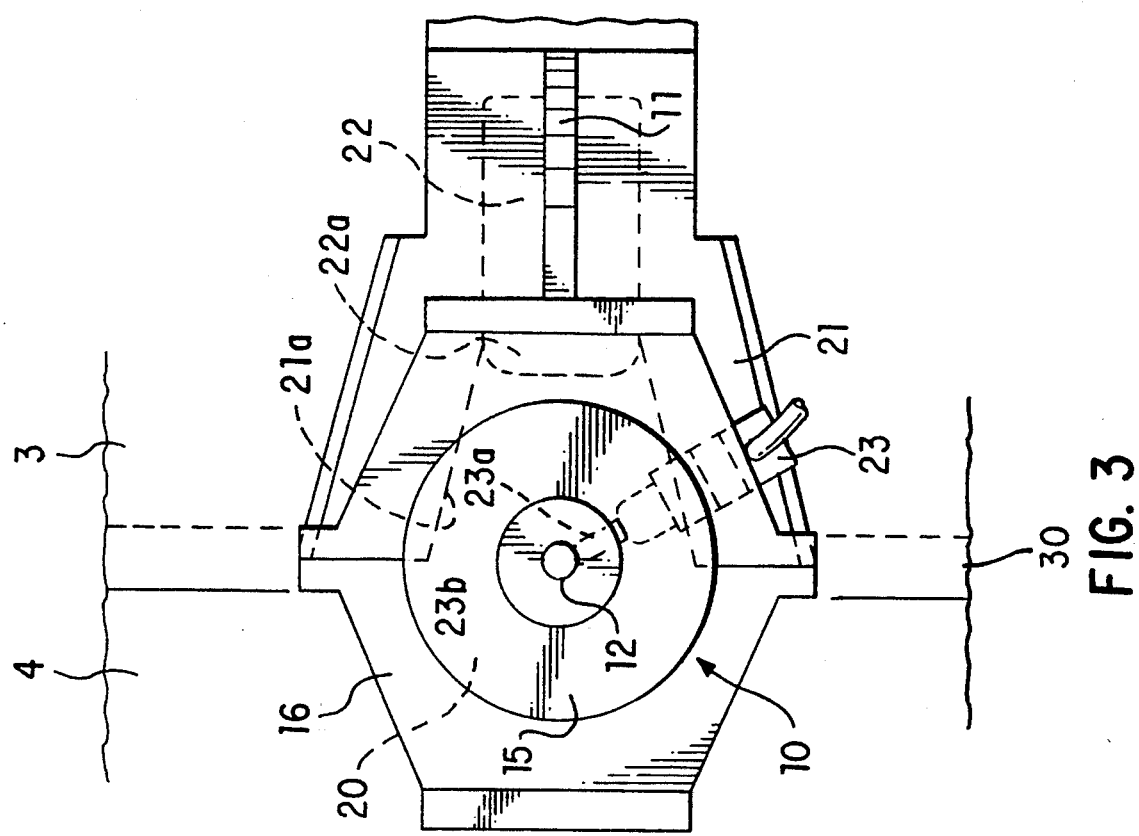
FIG. 3 is a plan view of the laser welding device of FIG. 1.

A generally U-shaped protection cover wall 21 is attached to and extends horizontally from the lower end of the bracket 11 so as to surround a space under the housing 15 above the table 2. Cover wall 21 is composed of an upper wall part or skirt that depends inclined outwardly and an integral lower wall part or skirt that depends inclined inwardly with the joint or hand between them having the largest diameter. Inside the protection cover wall 21 there are provided an air injector 22 and a gas injector 23, both of which are fixed to the protection cover wall 21. As shown in detail in FIGS. 1 and 3, the protection cover wall 21 is configured to open in three directions. That is, the protection cover wall 21 is formed with an upper opening 21a in upper wall part facing to the housing 15 of laser welding torch 10, a lower opening 21b in lower wall part facing to the slide table 2, and an opening (defined by the mouth of the U) facing forward in the direction A in which the slide table moves. The protection cover wall 21 thus configured does not interfere with passage or focusing of the laser beam Lb which is converging and traveling between converging lens 20 and slide table 2.

The gas injector 23, fed from a source of inert gas (not shown), is attached to the protection cover wall 21 near upper opening 21a, and injects and directs an inert gas, such as an argon gas, toward the lap seam 30 of flat aluminum plates 3 and 4. Specifically, the gas injector 23 has a gas injection nozzle 23b, which extends through the lower opening 21b of protection cover wall 21 from a gas pipe 23a. The nozzle 23b extends close to the slide table and is directed toward the portion of the lap seam 30 of flat aluminum plates 3 and 4 on the slide table 2 that is being irradiated and welded so as to direct an inert gas flow Gi toward and blanket the area where the laser beam Lb is focused on the lap seam 30 of flat aluminum plates 3 and 4 on the slide table 2. Accordingly, the portion of the lap seam 30 of flat aluminum plates 3 and 4, which is under irradiation of laser energy, is covered in or blanketed by an atmosphere of inert gas.

The air injector 22, which in turn injects high pressure air toward a space between laser welding torch 10 and sliding table 2, is located within the protection cover wall 21 and secured to the lower end of bracket 11. The air injector 22 terminates in an air injector head 22a which is inclined downwardly and is directed so as to inject high pressure air slightly forward of where the laser beam Lb is focused on the lap seam 30 of flat aluminum plates 3 and 4 on the slide table 2. This air injection head 22a is provided with at least two horizontally extending, vertically spaced slots or slit-like air injection nozzles 22a so as to form at least two thin parallel laminar flows of air Ap, like air curtains, which intersect the laser beam Lb at an acute angle and reach the surfaces of flat aluminum plates 3 and 4 at an acute angle slightly forward of the point or area of irradiation.

While laser beam Lb is focused by the converging lens 20 on the lap seam 30 of flat aluminum plates 3 and 4, the gas injector 23 injects and directs, from above, an inert gas to the lap seam 30 of flat aluminum plates 3 and 4 at point Gi where the laser beam Lb is focused, and, simultaneously, the air injector 22 injects and directs at least two thin laminar flows of air Ap, like air curtains, which intersect the laser beam Lb at an acute angle relative to the surfaces of flat aluminum plates 3 and 4. Because the gas pipe 23a extends close to the slide table and an air curtain formed by the air injector 22 crosses the laser beam above the point of irradiation, there is no interference between the inert gas and air curtain.

Forming at least two, pressurized air curtains at an acute angle relative to the flat aluminum plates 3 and 4 between the flat aluminum plates 3 and 4 and the housing 15 of laser welding torch 10 effectively prevents molten spatters produced from the lap seam 30 under welding from scattering toward the protective glass plate 18 of the laser welding torch 10, and hence sticking to it. Furthermore, because the air injector head 22a is positioned within the U-shaped protection cover wall 21, air curtains provided by the air injector 22 surrounded by the U-shaped protection cover wall 21 do not catch molten spatters in the ambient air.

It is to be understood that although the present invention has been described with respect to a preferred embodiment thereof, various other embodiments and variants, which falls within the scope and spirit of the invention, may occur to those skilled in the art. Such other embodiments and variants are intended to be covered by the following claims.

What is claimed is:

1. A laser working device for working a workpiece moving below and relative thereto comprising:
   a housing defining an opening in the bottom thereof;
   laser beam means located in said housing for directing laser radiation out of the opening in said housing;

a converging lens mounted in said housing for directing said laser beam approximately vertically through said opening with respect to and focusing same onto an area in the plane of a workpiece moving below and relative to said housing;

gas injection means mounted for directing inert gas forwardly in the direction of relative movement of the workpiece and covering said area onto where said laser beam is focused; and air injection means mounted for forming and directing a laminar of air to cross said vertical laser beam at an acute angle and to intersect the plane of the workpiece forwardly of the said area onto where the laser beam is focused, thereby forming a downwardly directed air curtain between said converging lens and the workpiece.

2. A laser working device as defined in claim 1, wherein said air injection means comprises a downwardly inclined air nozzle having a horizontally extending slot.

3. A laser working device as defined in claim 2, wherein said air nozzle has a plurality of said slots arranged vertically spaced.

4. A laser working device as defined in claim 1, further comprising a cover member for confining said laminar of air.

5. A laser working device as defined in claim 4, wherein said cover member is configured in a U-shape.

6. A laser working device as defined in claim 1, further comprising a protective glass plate mounted in said housing on the side of said converging lens remote from said laser beam means.

* * * * *